Patented Apr. 6, 1948

2,439,076

UNITED STATES PATENT OFFICE 2,439,076

COPOLYMER OF DICHLOROSTYRENE, BUTADIENE-1,3 AND PIPERYLENE

Charles C. Clark, Kenmore, N. Y., assignor to The Mathieson Alkali Works, Inc., New York, N. Y., a corporation of Virginia No Drawing. Application November 19, 1943, Serial No. 510,922

2 Claims. (Cl. 260—74)

This invention relates to a novel class of synthetic rubber-like materials resulting from the copolymerization of nuclear dichlorostyrenes and conjugated open chain dienes, specifically butadiene-1,3 and piperylene. The invention provides new and improved rubber-like products characterized by novel and highly desirable combinations of properties.

Synthetic rubber-like materials, commonly designated "synthetic rubber," have previously been prepared by the copolymerization of butadiene or other conjugated open chain diene with various monomeric vinyl compounds such as styrene, vinyl naphthalene, acrylonitrile, and the like. Such interpolymerization is usually accomplished in aqueous emulsion containing, in addition to water and the co-polymerizing components, such materials as emulsifying agents, emulsion stabilizers, catalysts to accelerate the reaction and sometimes other modifiers.

However, previous production of such rubber-like materials has encountered numerous difficulties. In the first place, the rate of reaction of styrene and its homologues is relatively slow and time-consuming. Other disadvantages encountered have been the undesirable characteristics of the synthetic rubber product by reason of which the product has been unsuited or poorly suited for certain purposes. For example, such products in the unvulcanized state have been found deficient in tackiness and ability to adhere upon being pressed together. Further, after vulcanization they have been found deficient in resilience and resistance to softening and deterioration by heat and to be relatively inflammable. Among other defects of such co-polymers of the prior art is their hardness, which renders milling difficult, and their lack of resistance to oils.

A vast amount of research has been carried on having as its purpose the elimination or mitigation of such previously experienced difficulties. A substantial improvement in the art is disclosed and claimed in the co-pending application of John C. Michalek, Serial No. 449,475, filed July 2, 1942, now abandoned, in accordance with which certain polymerizable nuclear chlorinated styrenes are co-polymerized with a conjugated open chain diene. It has also been proposed that, instead of co-polymerizing a single conjugated open chain diene with such polymerizable nuclear chlorinated styrenes, a mixture of conjugated open chain dienes be used.

The present invention is based on my discovery that particularly advantageous results may be obtained by polymerizing a mixture of nuclear dichlorostyrene, butadiene-1,3 and piperylene. The mixture contains 20–46% by weight of nuclear dichlorostyrene and substantially more butadiene-1,3 than piperylene—65 to 85 mole percent on the total amount of butadiene-1,3 and piperylene.

The product of my present invention is particularly suitable for the manufacture of rubber goods and is characterized by particularly desirable properties hereinafter more fully described and specifically illustrated.

The nuclear chlorinated styrene used in accordance with this invention may with advantage be the nuclear dichlorostyrene characterized by a density ($D_4^{25}$) of 1.236 to 1.280 and a refractive index ($N_D^{25}$) of 1.5724 to 1.5838 described and claimed in the co-pending application of John C. Michalek, Serial No. 387,862, filed April 10, 1941, now abandoned, including any of the pure isomers or mixtures thereof, for example, 2,3-; 2,4-; 2,5-; 2,6-; 3,4-; and 3,5-dichlorostyrene. The 2,5-dichlorostyrene has been found to be particularly desirable as the vinyl component.

The polymerization reaction is with advantage effected in aqueous emulsion by the following general procedure: The nuclear chlorinated styrene and conjugated diene components, in the desired proportions, are charged to an autoclave equipped with a stirrer. There is also added water and a suitable catalyst, for example hydrogen peroxide, urea peroxide, benzoyl peroxide, potassium persulfate or sodium persulfate. An emulsifying agent, an emulsion stabilizer such as gelatine, glue or casein and, if desired, a modifying agent such as ethylene dichloride, chloroform, carbon tetrachloride or other closely related halogen compounds and a surface tension regulator such as capryl alcohol or normal octyl alcohol, are also charged to the autoclave. The autoclave is then closed and heated to the reaction temperature for a period of time sufficient to complete the reaction. Thereafter the autoclave is cooled and the co-polymer coagulated by conventional methods such as by freezing, acidifying or salting out.

If desired, the emulsion may be prepared and subsequently charged to the autoclave or a solution of the accessory materials may be prepared in the autoclave and the co-polymerizing components subsequently added and emulsified therewith.

Emulsifying agents which may be used with advantage in this process include alkali metal salts of high molecular weight, alkyl sulfates, alkali metal alkyl benzene or alkyl naphthalene sulfonates, alkali metal sulfo ethyl oleate and salts or other sulfonated esters and oils as well as the more common soaps such as sodium or ammonium oleate or laurate. In fact, ammonium oleate and laurate have been found to be particularly effective emulsifying agents for this purpose. The portion of emulsifying agents used is not particularly critical. Proportions by weight ranging from about 0.5% to about 15% of the reactive components of the co-polymerizing mixture have been used with advantage.

The proportion of catalyst employed is less critical than in operations where unchlorinated styrene is used as the monomeric vinyl component and may be varied within wide limits. Even in the absence of an accelerating catalyst, the reaction has been found to proceed more rapidly than the reaction of conjugated diolefins with styrene, for example, when a catalyst is used. However, the reaction proceeds even more rapidly where a catalyst, such as previously mentioned, is used and, therefore, the use of such catalyst is usually desirable.

In place of the alcohols previously mentioned, other substantially water-insoluble alcohols, having from, say, 4 to 10 carbon atoms per molecule, may be used as surface tension regulators. The proportions of these and other modifying agents such as previously mentioned are likewise usually not critical and may be varied over a considerable range depending upon the results desired.

It is desirable that the various components and reagents used in the practice of my invention be free from aldehydes since even small amounts of aldehydes appear to hinder the co-polymerization reaction. Generally, any aldehydes present in the various components may be readily removed therefrom prior to use by treatment with a carbonyl-reactive reagent such, for example, as sodium bisulfite, meta-sulfite, sodium hydrosulfite or the like. Since only small amounts of aldehydes are ordinarily present in these constituents, treatment with solid bisulfite or the like serves to remove such impurities. It is desirable to take the precaution of removing any aldehydes present in order that the co-polymerization may proceed at the rapid rate characteristic of the co-polymerization components of my present invention.

My invention will be further illustrated by the following specific examples of its application in the production of my novel rubber-like products. It will be understood, however, that these examples are for purposes of illustration and that the invention is not limited thereto. In each instance, the proportions are by weight.

Example I

An emulsion was prepared comprising 465 parts of dichlorostyrene, 128 parts of 75% piperylene, and 2500 parts of water, using as the emulsifying agent ammonium oleate made from 4.4 parts of 28% ammonia and 35.6 parts of oleic acid. Prior to forming the emulsion, 10 grams of a good quality bone glue, used as a stabilizer, and 4.17 parts of sodium perborate were added to the aqueous solution and 0.05 part of benzoyl peroxide was dissolved in the dichlorostyrene-piperylene mixture.

To the resulting emulsion, while being stirred in the autoclave, there was slowly added 407 parts of conjugated butadiene. The stirring was continued for 12 hours during which time the temperature was maintained at 70° C. Thereafter, the charge was withdrawn from the autoclave, diluted and the co-polymer coagulated as in the preceding examples. The crude product was then washed on a rubber mill at 45° C. for 35 minutes and dried at 80° C. for 40 minutes. A yield of 604 parts of rubber-like sheet was obtained.

After compounding and curing, the product was found to have the following properties:

| Curing Time, Min. at 280° F. | Stress at 300% Elongation, lbs. per sq. in. | Shore Hardness | Tensile Strength, lbs. per sq. in. | Elongation, per cent | Set, per cent |
| --- | --- | --- | --- | --- | --- |
| 50 | 1340 | 68 | 2180 | 456 | 35 |
| 60 | 1380 | 68 | 2200 | 433 | 34 |
| 70 | 1440 | 70 | 2200 | 433 | 34 |
| 80 | 1540 | 70 | 2300 | 420 | 32 |
| 90 | 1610 | 70 | 2320 | 413 | 31 |

Here the stress was desirably low compared with the product of a comparable run in which a conjugated butadiene was the only diene employed, the stress of the latter being about 2,150 pounds. Also, the product showed a desirably low Shore hardness, an improved elongation characteristic, and other properties were in desirable ranges, as indicated.

Example II

In the foregoing example, conjugated butadiene was used as the principal conjugated diene. However, conjugated open chain dienes other than butadiene may be similarly used. Operations have been successfully carried out using such other conjugated open chain dienes as the principal diene component. For instance, in operations similar to those previously described, the following reactants and proportions thereof have been used with advantage.

| | Parts |
| --- | --- |
| Dichlorostyrene | 20 |
| Piperylene | 56 |
| Butadiene | 24 |

The reaction was carried out in apparatus similar to that previously described at a temperature of 55° C. Considerable polymerization occurred during the first 26 hours of operation. However, the operation was continued for a total of 116 hours and a product having desirable rubberlike characteristics was obtained.

The reaction temperature and the period of time required for completion of the co-polymerization reaction are, to a considerable extent, interdependent. The operating temperature may be varied over a considerable range, the optimum temperature being largely dependent upon the make up of the co-polymerizing mixture.

I prefer the specifically-described dichlorostyrene, because of its exceptionally high rate of reaction and the desirable characteristics of the resultant product. The use of 2,5-dichlorostyrene, in accordance with my present invention, has been found particularly desirable.

As shown by the foregoing specific illustrations, my improved co-polymers are particularly well adapted to vulcanization and curing, according to conventional practice in the manufacture of rubber goods and when so treated results in a novel rubber product. However, it will be understood that my invention contemplates this novel class of rubber-like materials either in the cured or uncured state. The vulcanized product is especially stable and has exceptionally desirable ageing characteristics.

An important advantage following from the use of my present invention is that the product is very tacky in its unvulcanized state and, when pressed together, adheres to a remarkable degree resembling natural rubber in this respect. A further desirable characteristic of these products is their resistance to softening and deterioration by heat and their relatively non-flammable nature. In this respect, they are distinguished from the halogen-free synthetic rubber-like materials previously known.

It will be understood that the intended meaning of the terms "polymerize," "polymerizable" and "polymerization," as used herein, is not restricted to the common dictionary definition, a union between two or more like molecules to form another compound having the same elements in the same proportions but a higher molecular weight and different physical properties, but that such terms are used herein in the more general sense to include inter-polymerization between unlike molecules, as indicated by the context.

I claim:

1. A synthetic rubber-like material consisting essentially of the reaction product of the interpolymerization of a mixture of monomeric materials, the reacting components of said mixture consisting of nuclear dichlorostyrene, butadiene-1,3 and piperylene, the proportion of nuclear dichlorostyrene in said mixture being 20%–46% by weight on the combined weights of said monomeric materials and the proportion of butadiene-1,3 constituting 65%–85% on a molar basis of the butadiene-piperylene component of said mixture.

2. A cured synthetic rubber-like material resulting from the vulcanization of the reaction product obtained by interpolymerization of a mixture of monomeric materials, the reacting components of said mixture consisting of nuclear dichlorostyrene, butadiene-1,3 and piperylene, the proportion of nuclear dichlorostyrene in said mixture being 20%–46% by weight on the combined weights of the monomeric materials and the proportion of butadiene-1,3 constituting 65%–85% on a molar basis of the butadiene-piperylene component of said mixture.

CHARLES C. CLARK.

REFERENCES CITED

The following references are of record in the file of this patent:

UNITED STATES PATENTS

| Number | Name | Date |
|---|---|---|
| 1,938,730 | Tschunkur | Dec. 12, 1933 |
| 2,234,204 | Starkweather | Mar. 11, 1941 |
| 2,373,753 | Fryling | Apr. 17, 1945 |
| 2,375,987 | Garvey | May 15, 1945 |
| 2,376,015 | Semon | May 15, 1945 |
| 2,384,535 | Craig | Sept. 11, 1945 |

FOREIGN PATENTS

| Number | Country | Date |
|---|---|---|
| 115,688 | Australia | Aug. 20, 1942 |